2,752,254

HECTOGRAPH BLACK

Walter G. Drautz, Glenmont, N. Y., assignor to General Aniline & Film Corporation, New York, N. Y., a corporation of Delaware No Drawing. Application April 29, 1953,
Serial No. 352,020

2 Claims. (Cl. 106—14.5)

This invention relates to the production of a black dye composition for use in hectograph inks and to the hectograph inks containing same.

It is generally recognized in the art relating to hectograph duplicating materials that a black hectograph ink which will meet the requirements of repeated use is difficult to obtain. In order to be of value as a black hectograph ink, it must be capable of printing a great many, as for example from 150 to 200, copies in a good deep black shade from a single master copy, and the last print made should not differ greatly in shade from the first print. Some known compositions initially give good deep black shades but on continued use the copies change to bluish, yellowish or orange shadings after about 20 copies have been made. This is due to the fact that a combination of spirit-soluble shading colors which blend to a shade approaching black is almost always employed. Obviously, not all shading colors may be blended together since certain forms are incompatible or do not produce the desired results. If the porper combination of shading colors is not employed, and if the proper proportions of such shading colors are not carefully controlled, the uneven exhaustion of these combined colors during use of the hectograph material creates a progressive imbalance in the proportion of the colors whereby the color remaining in said hectograph material in the largest proportion will predominate, thereby producing progressively poorer and inferior black prints.

Further, it is usually necessary to grind the black dye composition with the proper hectograph ink vehicle at high temperatures of around 175 to 200° F., at which temperatures the dyes tend to form a viscous gel, called livering which is highly objectionable. Still further, it is difficult to keep the black hectograph dye compositions in storage for any appreciable length of time in view of their tendency to deteriorate, inter-react, and the like.

It has now been found that an improved black dye hectograph composition for use in hectograph inks can be produced by combining certain specific dyestuffs in carefully controlled proportions. The composition of this invention comprises a mixture of 35 to 45 parts of Crystal Violet (C. I. 681), 40 to 45 parts of Chrysoidine (C. I. 20) and 15 to 20 parts of Rhoduline Blue (C. I. 658), by weight. Such a composition is in the form of a black, easily pulverizable powder which does not form a gel when ground with various ink vehicles at higher temperatures and which may be stored for many months without losing any of its desirable properties. It is possible to make 150 to 200 hectograph copies of a good black, without change of shade, with hectograph inks containing the dye compositions of this invention.

The composition in accordance with this invention may be produced by mixing the dyes in the proper amounts, dispersing the resulting dye mixture in a sufficient amount of water, and then drying the resulting dispersion, which is in the form of a slurry or suspension, to a very low moisture content, e. g., about 2 per cent or less. In forming the above dispersion, from about 80 to 200 parts by weight of water may be mixed with each 100 parts of dye mixture, although preferably the water and dye mixture are employed in equal parts by weight.

The following examples, in which parts are by weight illustrate various compositions produced in accordance with the instant invention. These examples are not to be regarded as limitative.

|  | Example 1 | Example 2 | Example 3 | Example 4 |
| --- | --- | --- | --- | --- |
| Crystal Violet | 39 | 40 | 40.5 | 43 |
| Chrysoidine | 43 | 42 | 43 | 42 |
| Rhoduline Blue | 18 | 18 | 16.5 | 15 |

The compositions of the above examples may be incorporated into any suitable hectograph ink vehicle or dope. These vehicles may comprise carnauba wax, beeswax, mineral oil, lanolin, vaseline, lard oil, lecithin or oleic acid or the like. For example, one effective method of making a suitable hectograph coating composition is to melt a wax, such as beeswax, and then add oleostearine, mutton tallow or lard oil or other suitable greasy or oily substance. The dye mixture is added to this ink vehicle and the composition then cooled and ground at high temperatures to produce a uniform paste-like mass in which the dye particles are intimately dispersed. This mass or ink composition flows sufficiently for coating on a sheet of paper or the like at a temperature of about 138° F. When so melted, it is flowed or otherwise applied as a coating on the carrier. Coating can be carried out up to 190° F. without thickening of the dope.

Various modifications and variations of this invention will be obvious to persons skilled in the art and it is to be understood that such modifications and variations are to be included within the purview of this application and the spirit and scope of the appended claims.

I claim:

1. A hectograph dye composition produced by mixing, calculated on a dry weight basis, about 35 to 45 parts of Crystal Violet, 40 to 45 parts of Chrysoidine, and 15 to 20 parts of Rhoduline Blue, in water, in proportions of about 80 to 200 parts by weight of water for each 100 parts of said dyestuff, and then drying the resulting suspension to a moisture content of no more than about 2%.

2. A hectograph ink comprising a dye composition as defined in claim 1 in a hectograph ink vehicle.

References Cited in the file of this patent

UNITED STATES PATENTS

| 2,492,163 | Locke | Dec. 27, 1949 |
| 2,586,570 | Skiles | Feb. 19, 1952 |